(12) United States Patent
De Laat et al.

(10) Patent No.: US 10,805,078 B2
(45) Date of Patent: Oct. 13, 2020

(54) NETWORK NODE

(71) Applicant: SIGNIFY HOLDING B.V., Eindhoven (NL)

(72) Inventors: Jules Martinus Adrianus Gerardus De Laat, Eindhoven (NL); Hassan Mansouri Jajai, Eindhoven (NL); Petrus Johannes Lenoir, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 217 days.

(21) Appl. No.: 15/757,072

(22) PCT Filed: Aug. 12, 2016

(86) PCT No.: PCT/EP2016/069213
§ 371 (c)(1),
(2) Date: Mar. 2, 2018

(87) PCT Pub. No.: WO2017/036768
PCT Pub. Date: Mar. 9, 2017

(65) Prior Publication Data
US 2018/0183591 A1 Jun. 28, 2018

(30) Foreign Application Priority Data

Sep. 3, 2015 (EP) .................... 15183668

(51) Int. Cl.
*H04L 29/06* (2006.01)
*H04L 9/12* (2006.01)
(Continued)

(52) U.S. Cl.
CPC .............. *H04L 9/12* (2013.01); *H04L 9/0819* (2013.01); *H04L 9/32* (2013.01); *H04L 63/0428* (2013.01);
(Continued)

(58) Field of Classification Search
CPC . H04L 63/0492; H04L 63/061; H04L 67/104; H04W 84/18
See application file for complete search history.

(56) References Cited

U.S. PATENT DOCUMENTS 5,966,450 A 10/1999 Hosford
7,464,266 B2 12/2008 Wheeler
(Continued)

FOREIGN PATENT DOCUMENTS

CN 1260921 A 7/2000
CN 1531239 A 9/2004
(Continued)

OTHER PUBLICATIONS

Illkyun, Im et al, "Security-Effective Local-Lighted Authentication Mechanism in NEMO-based Fast Proxy Mobile IPv6 Networks", International Journal of Digital Information and Wireless Communications (IJDIWC) 2(1): 86-103 The Society of Digital Information and Wireless Communications, 2012(ISSN 2225-658X).

*Primary Examiner* — Thaddeus J Plecha
(74) *Attorney, Agent, or Firm* — Daniel J. Piotrowski

(57) ABSTRACT

A network node (110) is provided having a normal mode and a coordinator mode. The network node comprises a counter (130) and an incrementing unit (132), the incrementing unit being arranged to increment the counter at regular time intervals. If the network node does not receive counter synchronization messages it switches to coordinator mode.

11 Claims, 10 Drawing Sheets

(51) Int. Cl.
*H04L 9/32* (2006.01)
*H04L 29/08* (2006.01)
*H04W 84/18* (2009.01)
*H04L 9/08* (2006.01)

(52) U.S. Cl.
CPC ........ *H04L 63/0492* (2013.01); *H04L 63/061* (2013.01); *H04L 63/123* (2013.01); *H04L 67/104* (2013.01); *H04W 84/18* (2013.01)

(56) References Cited

U.S. PATENT DOCUMENTS

| | | | | |
|---|---|---|---|---|
| 7,606,199 | B2* | 10/2009 | Ayyagari | H04L 41/044 370/331 |
| 7,672,457 | B2 | 3/2010 | Nagano et al. | |
| 9,445,221 | B2* | 9/2016 | Patro | H04W 84/20 |
| 10,117,205 | B2* | 10/2018 | Kim | H04W 56/00 |
| 2003/0174700 | A1 | 9/2003 | Ofek et al. | |
| 2004/0255001 | A1* | 12/2004 | Oh | H04W 56/0015 709/209 |
| 2005/0182932 | A1 | 8/2005 | Wheeler | |
| 2006/0018481 | A1 | 1/2006 | Nagano et al. | |
| 2008/0151778 | A1 | 6/2008 | Venkitaraman et al. | |
| 2010/0124240 | A1* | 5/2010 | Lu | H04W 56/00 370/503 |
| 2012/0060029 | A1 | 3/2012 | Fluhrer et al. | |
| 2013/0021956 | A1* | 1/2013 | Shuey | H04W 40/22 370/311 |
| 2014/0302787 | A1* | 10/2014 | Rantala | H04W 8/005 455/41.2 |
| 2015/0038083 | A1 | 2/2015 | Patro et al. | |

FOREIGN PATENT DOCUMENTS

| | | |
|---|---|---|
| CN | 104639373 A | 5/2015 |
| EP | 1880525 A1 | 1/2008 |
| EP | 1895444 A1 | 3/2008 |

* cited by examiner

NETWORK NODE

CROSS-REFERENCE TO PRIOR APPLICATIONS

This application is the U.S. National Phase application under 35 U.S.C. § 371 of International Application No. PCT/EP2016/069213, filed on Aug. 12, 2016 which claims the benefit of European Patent Application No. 15183668.1, filed on Sep. 3, 2015. These applications are hereby incorporated by reference herein.

FIELD OF THE INVENTION

The invention relates to a network node, a network method, a computer program, and a computer readable medium.

BACKGROUND

In open networks on which an attacker can become active by eavesdropping and sending messages it is important to know that messages come from trusted senders. For example, in control networks such as lighting network, this prevents malicious control. The open network may for example, by an Ethernet or Wi-Fi network.

In a control network where many nodes need to communicate with each other, group communication is most efficient, e.g., multicast or broadcast.

In order to protect the communication, often a cryptographic key is shared between the nodes in the group. The cryptographic key is used to authenticate messages that are passed between the nodes. Nevertheless, messages can still be sniffed and an attacker can replay messages to control the system. Even if the messages are encrypted, it may be straightforward to match an encrypted message to a specific command.

By adding a changing value to the packet, identical commands will result in different packets but if the changing value is simply ignored by the receiver after decoding the packet, replayed packets are still accepted by the system as valid.

A possible solution to this problem may have a synchronized clock in each network node. The communication between two nodes may include a timestamp in a message before authentication. The timestamp allows verification that a received message is fresh and prevents, at least up to a point, replay of messages.

Unfortunately, in many networks, in particular in control networks, there is often neither a reliable source of time in the network nor a way to synchronize time across the nodes in the groups of network nodes. Furthermore, such a source of time would be a so-called single-point-of-failure (SPOF) which is undesirable.

SUMMARY OF THE INVENTION

It would be advantageous to have an improved network node.

A network node is presented having a normal mode and a coordinator mode. The network node comprises:
a communication unit arranged to send and receive electronic messages within a group of network nodes,
a counter and an incrementing unit, the incrementing unit being arranged to increment the counter at regular time intervals,
a counter manager, wherein the counter manager is arranged to:
  in normal mode:
    upon receiving a counter synchronization message, adjust the counter to a received counter value in the received counter synchronization message, and start a synchronization timeout period,
    upon expiry of the synchronization timeout period without receiving a counter synchronization message during the synchronization timeout period, switch the network node to coordinator mode,
  in coordinator mode:
    periodically send a counter synchronization message to the network nodes in the group, said counter synchronization message comprising a current value of the counter.

By periodically sending a counter synchronization message the counter remains synchronized with other counters with which the network node may communicate. In particular this addresses situation such as network delays, and inaccurate counters.

The network node switches to coordinator mode if the network node fails to receive counter synchronization messages after some timeout interval. In this way, even if there is no coordinator in the group of network nodes, a coordinator will appear. This in turn will make sure the nodes in the group stay synchronized. Moreover, this addresses the problem of single point of failure caused by a single coordinator node. If the coordinator node breaks down one of the non-coordinator nodes will take up the coordinator role.

In an embodiment, in coordination mode, the counter manager is arranged to upon receiving a counter synchronization message, send a resign message, the resign message comprising a counter value stored in the counter. In case two nodes in coordinator mode appear they can arbitrate who should switch back to normal mode.

The network node is an electronic device. For example, the network node may be a sensor or a light switch or a lamp. The network node may be an HVAC device.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium. For example, the method may be implemented as part of a protocol stack.

BRIEF DESCRIPTION OF THE DRAWINGS

Further details, aspects and embodiments of the invention will be described, by way of example only, with reference to the drawings. Elements in the Figures are illustrated for simplicity and clarity and have not necessarily been drawn to scale. In the Figures, elements which correspond to elements already described may have the same reference numerals. In the drawings, FIG. 1a schematically shows an example of an embodiment of a network node, FIG. 1b schematically shows an example of an embodiment of group of network nodes, FIG. 2 schematically shows an example of an embodiment of electronic messages, FIG. 3 schematically shows a sequence diagram illustrating an example of sending a message, FIG. 4 schematically shows a sequence diagram illustrating an example of switching to coordinator mode, FIG. 5 schematically shows a sequence diagram illustrating an example of starting-up a group of network nodes, FIG. 6 schematically shows a sequence diagram illustrating an example of adding a network node to a group of network nodes, FIG. 7 schematically shows a sequence diagram illustrating an example of merging two groups of network nodes, FIG. 8 schematically shows a sequence diagram illustrating an example of merging two groups of network nodes, FIG. 9 schematically shows a sequence diagram illustrating an example of replaying a message, FIG. 10a schematically shows a computer readable medium having a writable part comprising a computer program according to an embodiment, FIG. 10b schematically shows a representation of a processor system according to an embodiment.

Figure 1A:
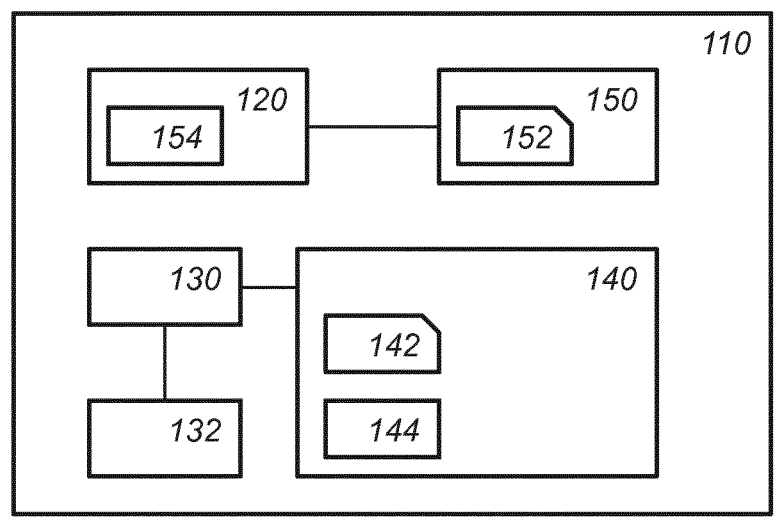
Figure 1B:
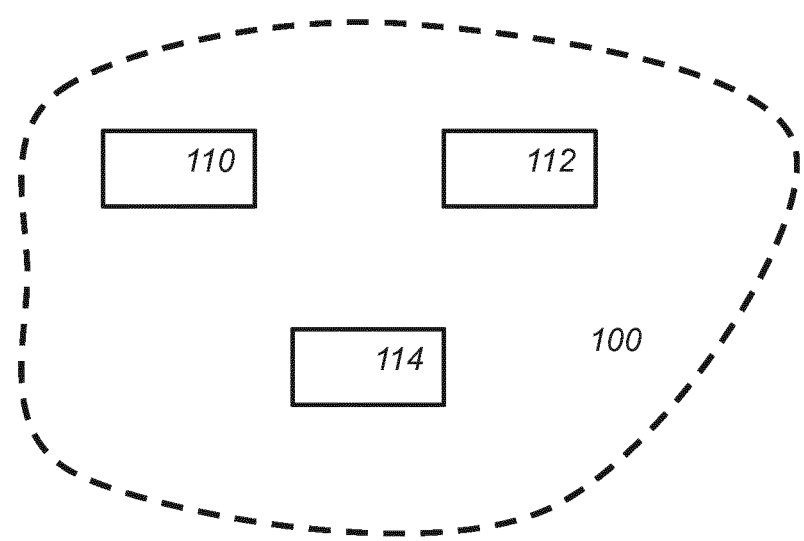

LIST OF REFERENCE NUMERALS IN FIGS. 1a, 1b AND 2

100 a group of network nodes
110, 112, 114 a network node
120 a communication unit
130 a counter
132 an incrementing unit
140 a counter manager
142 a mode
144 a timer
150 a key storage
152 a cryptographic key
154 a cryptographic unit
201, 201' an authenticated message
202 a counter synchronization message
203 a counter synchronization request message
204 a resign message
205 a resigned message
206 a member request message
207 a membership message
212 a counter value
213 a counter value received from the other network node
220 authenticated data
222 a counter synchronization indication
223 a counter synchronization request indication
224 a resign indication
225 a resigned indication
226 a member request indication
227 a membership indication
230, 230' encrypted data
231 data
240 an authentication token

DETAILED DESCRIPTION OF PREFERRED EMBODIMENTS

While this invention is susceptible of embodiment in many different forms, there are examples shown in the drawings and one or more specific embodiments will herein be described in detail, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described above or recited in mutually different dependent claims.

FIG. 1a schematically shows an example of an embodiment of a network node 110. Network node 110 is an electronic device. Network node 110 comprises a communication unit 120 arranged to send and receive electronic messages within a group of network nodes 100. An example of a group of network nodes 100 is shown in FIG. 1b. FIG. 1b shows three network nodes of group 100: network nodes 110, 112, and 114.

Communication unit 120 may be arranged for wireless communication. For example, communication unit 120 may comprise an antenna arranged for wireless communication. For example, communication unit 120 may be arranged for Wi-Fi communication, or for some other wireless technology, say, by employing a predetermined wireless protocol. Communication unit 120 may also, or instead, be arranged for wired communication, e.g., Ethernet communication.

The other devices in group 100 may be a network node according to an embodiment. In particular, the other nodes in group 100 may be of the same design as network node 110. To simplify the description, only network node 110 is described in detail.

The network nodes in group 100 comprise a communication unit arranged to communicate within the group. In an embodiment, the network nodes in group 100 may be arranged for broadcast and/or multicast communication within group 100. For example, in an embodiment, communication unit 120 is arranged to send a message by broadcasting said message, so that it is received by all other network nodes in group 100.

Network node 110 comprises a counter 130 and an incrementing unit 132. In an embodiment, the incrementing unit is arranged to increment the counter at regular time intervals. For example, counter 130 may be implemented as an electronic memory, say as a register, etc. For example, counter 130 may be a 32 bit register. Incrementing unit 132 may comprise a crystal or an RC-oscillator to time incrementing the counter at regular intervals. The regular interval may be say, a second, or shorter, say $\frac{1}{10}$ a second, or longer say 2 seconds, etc. Counter 130 and incrementing unit 132 may comprise a clock. Interestingly, it is not required that the state of counter 130 is maintained after a power-down and power-up cycle. In fact, in an embodiment, counter 130 is randomized after start-up of the network node. For example, network node 110 may comprise a (pseudo) random number generator (not separately shown) arranged to randomize counter 130 after network node 110 is powered-up, e.g., switched on.

The real time accuracy of the devices does not need to be very good. Experiments have shown that if they are within 1-2% accuracy the mechanisms described herein work correctly. Even lower accuracy will work depending on the frequency with which counter synchronization message are sent, and the acceptance window, e.g., delay threshold, for correct counter values.

In normal operations, the counters of the network nodes in group 100, e.g., of network nodes 110, 112 and 114 are synchronized, e.g., values taken from the respective counters in group 100 at the same absolute moment in time differ less than a first threshold. It may happen though that for various reasons, the counters in group 110 are not synchronized, e.g., after one or more of the network nodes started-up. Embodiments are described that address this issue.

Communication unit 120 obtains the value of counter 130 and includes it in a message before sending it Likewise, when communication unit 120 receives a message, communication unit 120 may obtain a received counter value from the received message and verify that it differs less than a delay threshold from a counter value stored in the counter of the network node. This indicates that the received message is fresh, i.e., sent recently from the sending network node. The delay threshold may for example be taken as the sum of the first threshold and the delay in communication, e.g., the network delay. In addition, some safety margin may be included to reduce the chance of a valid message being rejected. For example, the delay threshold may be taken as 1 second in a local wireless network. The delay threshold may also be longer, say 5 seconds, or shorter, say 0.5 seconds. In a faster network, with higher quality increment mechanism, the delay threshold may be reduced.

The tolerance afforded by the delay threshold should not only compensate for network latency but also for clock inaccuracy. Even negative offsets are possible between a received counter value and the counter value in counter 130; a received message may include a counter value that is ahead of the counter of the receiving node. The delay threshold may also be called an 'acceptable offset' from the counter 130.

For example, given that counter 130 currently stores the value of, say, 908005, which is increased every $1/100$ of a second. Suppose the delay threshold is 200, here in the same units the counter, i.e., representing 2 seconds. In an embodiment, a counter value in a received message would be accepted if it falls in the interval between 907805 and 908205.

In an embodiment, counter 130 is implemented with a fixed number of bits, in which case care is taken to correctly handle a potential roll-over of counter 130. For example, continuing the above example, suppose the counter is implemented as an unsigned 32-bit value. If the counter stores the value $2^{32}-100$, received values will be accepted that are between $2^{32}-300$ and $2^{32}-1$, and between 0 and 100.

However, including only a counter value in a message does not provide sufficient security for most applications. To address this, the message may be authenticated. For example, in an embodiment network node 110 comprises a key storage 150 arranged for storing a cryptographic key 152. Communication unit 120 is arranged to authenticate a message with the cryptographic key before sending said message. For example, Communication unit 120 computes an authentication token for the data which is to be authenticated using cryptographic key 152. In an embodiment, the key may be the private key of a public/private key pair, e.g., an asymmetric key. In the latter case, communication unit 120 may compute an electronic signature and add it as an authentication token to the message. The communication unit of another network node may verify the authentication token, in this case the signature, using the public key corresponding to the private key used to generate the signature.

In an embodiment, key 152 is a so-called symmetric key. Examples of authentication tokens using a symmetric key include Message Authentication Codes (MAC), e.g., CBC-MAC, CMAC, using various block ciphers, e.g., AES, such as AES-128, DES, etc. The network nodes in group 100 may all have access to cryptographic key 152 through which they may verify an authentication token, e.g., a so-called group key. Knowledge of the group key proves membership of the group. Below we will further assume a symmetric group key, although it is noted that this is not necessary. The group key may be set in all the nodes of the group, e.g., by pre-programming the key in the nodes, or by provisioning the key using a point-to-point handshake authorization, say using the TLS protocol.

Successfully verifying an authentication token proves that the authentication token was created by someone who had access both to the message and to key 152. For example, the communication unit may be arranged to reject a received message after failing to verify an authentication of the received message with the cryptographic key. In addition, the communication unit may be arranged to reject a received message after failing to verify that a received counter value obtained from the received message differs less than a delay threshold from a counter value stored in the counter of the network node. The combination of correct authentication and a received counter value which is sufficiently close to the counter value stored in counter 130 significantly reduces the opportunities for replay of a message by an attacker. Thus communication unit 120 is arranged to use counter 130 and key 152, whether symmetric or asymmetric, to protect messages send and received in group 110, e.g., through unit 120.

In addition to authenticate, communication unit 120 may also encrypt data with cryptographic group key 152. The encrypted data may be decrypted by any node using key 152. To improve security, the authentication and encryption may include a key diversification step, for example, key 152 may be diversified with a first identifier to obtain an authentication key, say by computing a cryptographic hash over key 152 concatenated with a byte 00; and may be diversified with a second identifier to obtain an encryption key, say by computing a cryptographic hash over key 152 concatenated with a byte 01. In an embodiment, key storage 150 includes separate authentication and encryption key, so that no additional diversification is required. For simplicity, we will only refer to key 152 from now, although it is noted that key diversification may be included in encryption and/or authentication to obtain separate keys.

Network node 110 may comprise a cryptographic unit 154 to compute authentication tokens, encryptions, decryptions, and the like. Cryptographic unit 154 may be part of communication unit 120, as shown in FIG. 1a, but this is not necessary. Cryptographic unit 154 is well suited for implementation in hardware, although this is not necessary.

The network nodes in group 100 may form a control network. For example, nodes 110, 112 and 114, etc., may control other devices, for example, they may control lamps, etc., in a lighting network. The network nodes in group 100 may form a sensor network. For example, the nodes 110, 112 and 114, etc., may comprise one or more sensors.

In an embodiment, network node 110 is arranged to accept commands received through a message. If the message is accepted as authentic, network node 110 executes the command. Executing the command may include sending a response message.

FIG. 2 shows an embodiment of an authenticated message 201. Message 201 includes a counter value 212 obtained from counter 130, data 220 which is only authenticated and data 230 which is both encrypted an authenticated. Counter value 212 is also authenticated. For example data 230 may first be encrypted with key 152, next counter value 212, data 220 and encrypted data 230 are authenticated, e.g., by computing an authentication token 240. Authentication token 240 may be a MAC or a signature. If no confidentiality is needed data 230 may be omitted.

FIG. 2 shows an alternative embodiment of an authenticated message 201' without computing an explicit authentication token. Data 231 is encrypted together with counter value 212 to produce encrypted data 230'. In this embodiment, only an encryption step is performed to perform both authentication and encryption. For example, the encrypting may be a block cipher using a counter-mode or cbc-mode, etc., using the counter value as initialization vector (IV). This format, providing authentication through the encrypting is assumed in FIGS. 3-10. Also data 231 may be commands, status data, sensor readings, etc.

In particular, the authentication and encryption mode may be the so-called CCM mode, (see, e.g., Recommendation for Block Cipher Modes of Operation: The CCM Mode for Authentication and Confidentiality. Nist special publication 800-38c). The underlying block cipher may be say AES, DES, RC5, Blowfish etc.)

An authenticated message, such as message 201 and 201' may comprise an authenticated message indication, which indicates to the network node that this is an authenticated message (not shown in FIG. 2).

The network node 110 is arranged with a number of different modes; these modes include a normal mode and a coordinator mode, and may also include an initialization mode.

In normal operation, there should be only one network node that is running in coordinator mode. All other network nodes run in normal mode. In an embodiment, a network node will only run in initialization mode during power-up or after reset of the network node. If there are multiple network nodes running in coordinator mode, the network nodes may address this issue as indicated below. In an embodiment, network node 110 comprises a reset mechanism which set the mode to initializing, and possibly also randomizes the counter.

In normal mode, network node 110 is arranged to send and/or receive authenticated messages. Using the counter 130 and key 152, received messages are rejected if a received counter value therein is not fresh, e.g., not within the delay threshold of counter 130, or if the authentication is not correct. Using the counter 130 and key 152, messages for sending may be likewise protected. In addition to an authenticated counter value a message may comprise an authenticated and optionally encrypted pay load. The pay load depends on the application, and may comprise, e.g., commands, status messages, sensor readings and the like.

Furthermore, the counter manager 140, when in normal mode, is arranged to upon receiving a counter synchronization message, adjust the counter to a received counter value in the received counter synchronization message. In this way, the counter 130 keeps being synchronized with the counter of a coordinator node. The counter manager is arranged to, when in coordinator mode to periodically send a counter synchronization message to the network nodes in the group, said counter synchronization message comprising a current value of the counter. The periodically sending may be a regular sending, say sending a counter synchronization message after each elapse of a fixed time interval, say 1 second, or 5 seconds, 1 minute, etc. The periodic sending does not need to be regular however. For example, the counter manager may send a counter synchronization message depending on network load, say if network load is below a network load threshold or depending on the load of network node 110, e.g. if the network node load is below a network node load threshold. Also a combination is possible, say to send depending on load or traffic but not more frequent than once every fixed time interval.

Figure 3:
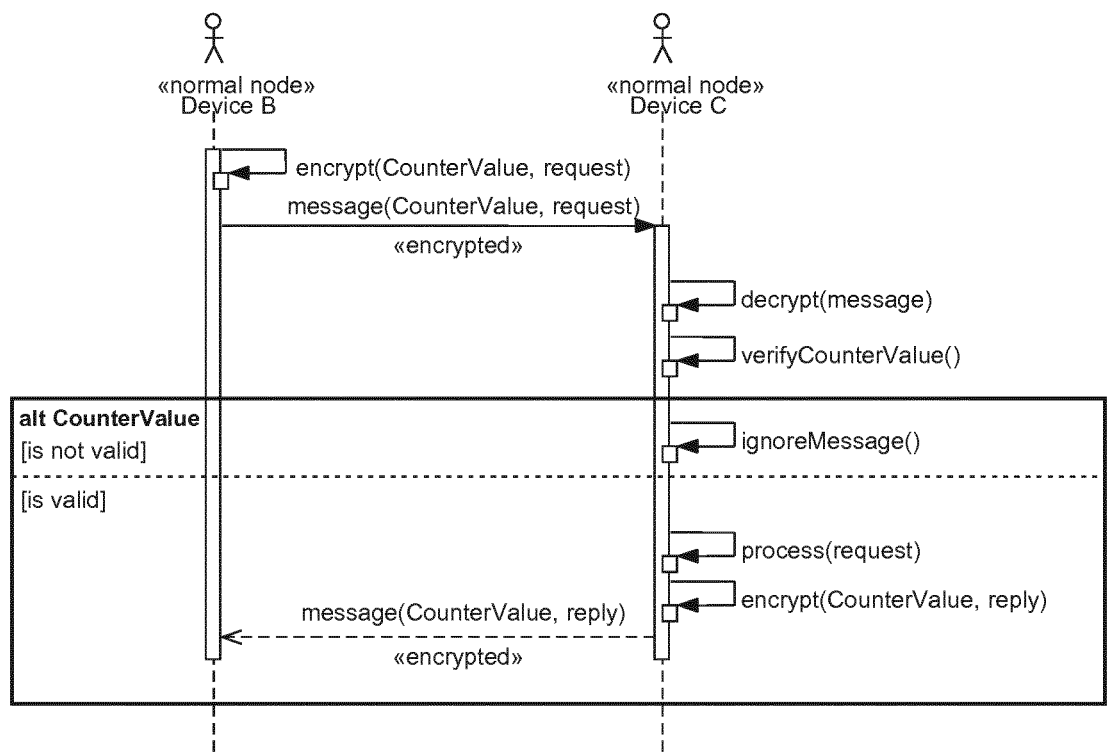

FIG. 3 shows a possible sequence diagram of an embodiment of sending and receiving an authenticated message. Shown are two normal nodes, devices B and C, e.g., network nodes in normal mode. Device B sends a request to device C which includes a counter value and which is authenticated through encryption, e.g., as in message 201'. For example, the request may request a sensor value, or may be some command, etc. Device C, decrypts the message, and verifies the counter value with its own counter. With the abbreviation 'alt' two alternatives are shown with respect to the latter validation. If the received counter value is not valid, the message is ignored; otherwise the message is accepted, the request processed, and a response is sent in the same manner as device A did.

In all sequence diagrams, time flows from top to bottom, i.e., earlier messages are shown at the top, and later messages are shown at the bottom. The sequence diagrams are shown to explain the invention but may comprise many optional elements. For example, in FIG. 3, device B does not need to send a request, device C does not need to respond to the request, authentication may be verified in different ways, e.g., as in message 201, etc.

In an embodiment, a network node running in coordinator mode can also participate in normal network traffic, by sending and receiving authenticated messages such as messages 201 or 201'. This is not necessary though, a network node in coordinator mode could dedicate itself to coordinator tasks; for low-resource, disposable network nodes, such as swarms, this may be preferable.

Network node 110 comprises a counter manager 140. Counter manager 140 improves the synchronization of counter 130 with the counters of other nodes in group 100. In an embodiment, counter manager 140 stores a representation of the current mode 142; mode 142 may also be stored elsewhere. The behavior of network node 110 and in particular counter manager 140 differs depending on the mode.

In coordinator mode, counter manager 140 periodically sends a counter synchronization message to the network nodes in group 100, said counter synchronization message comprising a current value of the counter 130. FIG. 2 show an embodiment of a counter synchronization message 202. Counter synchronization message 202 comprises a counter value 212, in this case obtained from counter 130 of network node 110. Counter synchronization message 202 comprises a counter synchronization indication, say a bit string indicating that this is a counter synchronization message. Indicating messages, such as counter synchronization indication, may be so-called magic numbers. If explicit authentication tokens are used, counter synchronization message 202 may comprise an authentication token 240, e.g., a MAC, computed over counter value 212 and counter synchronization indication 222; instead the construction of message 230' may be used.

For example, an RC-oscillator or crystal, etc., may be used to time the periodic sending of counter synchronization messages. For example, a counter synchronization message may be sent every minute, of more frequent, say every 10 seconds, or less frequent say every 2 minutes, 10 minutes, etc. The frequency of sending counter synchronization message depends on factors, such as the dependability of the counter 130, etc. If counter 130 does not keep time very well, more frequent counter synchronization message may be sent. Counter manager 140 may use increment unit 132 to time the periodic sending of the clock synchronization messages.

In normal mode, the counter manager is arranged to, upon receiving a counter synchronization message, adjust counter 130 to a received counter value in the received counter synchronization message. This has the effect that the counters within group 100 stay synchronized. As a result of network delay a counter of a normal node may be slightly behind the counter of a coordinator node. However, this is not a problem and may be accounted for in the delay threshold. Counter 130 can also be ahead of the received counter, e.g., due to a slightly faster clock. Note that network node 110 in normal mode will not accept a message, including a counter synchronization message, if it does not pass the authentication and counter value validations. The counter value received in an accepted, e.g., non-rejected, counter synchronization message differs less than the delay threshold from the counter value in counter 130.

If verification of the authentication is fast compared to the delay threshold, the counter 130 may be adjusted by overwriting with the received counter value. In more precise embodiments, corrections may be made for the verification of the authentication, for example, by overwriting the counter 130 with the received counter plus an authentication delay. For example, upon receiving a counter value y, a copy can be made of the counter 130, $x_1$, after successful verification counter 130 may adjusted to $y+(x_2-x_1)$, in which $x_2$ is the value of counter 130 after verification of the authentication.

After receiving a correct counter synchronization message in normal mode, counter manager 140 start a synchronization timeout period. For example, if the counter synchronization messages are sent, e.g., every minute, the synchronization timeout period may be set to say, twice that, e.g., two minutes. In an embodiment, a random delay is added to timeout periods, this avoids the network collisions.

If the synchronization timeout period expires (still in normal mode) without receiving a counter synchronization message during the synchronization timeout period, the counter manager switches the network node to coordinator mode, e.g., mode 142 may be overwritten with the representation of coordination mode.

Figure 4:
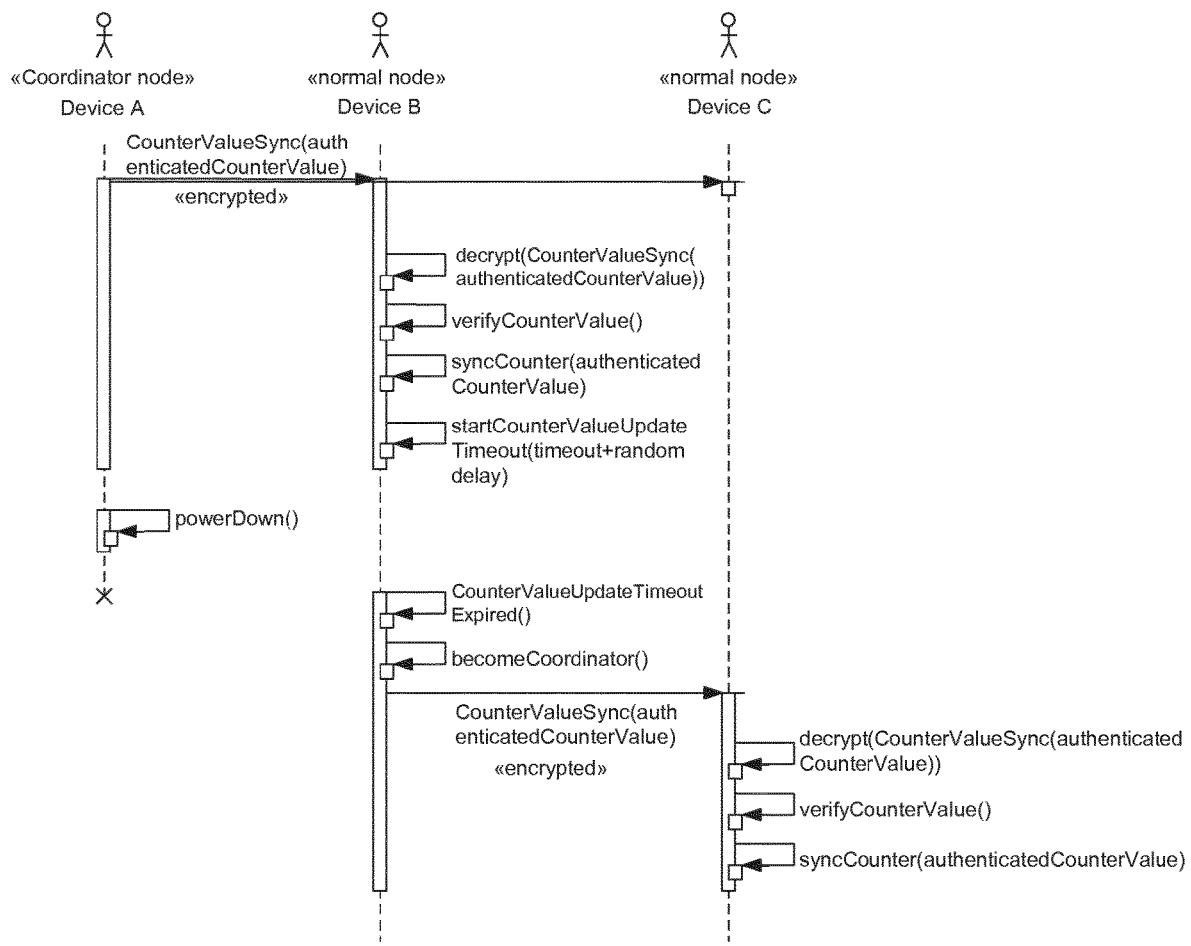

FIG. 4 shows a possible sequence diagram of an embodiment of switching to coordinator mode. Shown are two network nodes in normal mode, i.e., normal nodes: devices B and C, and one network node in coordinator mode: device A. Device A sends a counter synchronization message (CounterValueSync) to devices B and C. The devices verify the message, including the received counter Value and synchronize their counters. Next they start a synchronization timeout period (startCounterValueUpdateTimeout). These actions are only shown for device B for clarity. In this example, coordinator node A powers down, e.g., for maintenance, or due to malfunction, or loses network connection etc. As a result, no further counter synchronization messages are sent in the group. The timeout set by devices B and C includes also a random component. In FIG. 4, the timeout of device B happens to expire earlier. As a result device B switches to coordinator mode and starts to send counter synchronization messages. Preferably, device B sends a counter synchronization message immediately after the timeout. Note that device C will accept the counter synchronization message of device B, since he authenticates using the same group key 152 as previous coordinator A; moreover, the counters of B and C are still synchronized, thus device C will find that the counter value received from device B differs little from its own counter value. Thus after coordinator A went offline, another node seamlessly takes over the role of coordinator with only minimal disruption of the network.

In an embodiment, a network node in normal mode will only accept authenticated messages, e.g., including a fresh counter value and authenticated with the correct key; although in an embodiment a network node could be configured to accept some other messages, for example a network node may be configured with a maintenance cryptographic key, which is only used for special message messages, say network control messages, say to reset a device or to turn a device on or off etc. A message authenticated and possibly encrypted with the maintenance cryptographic key does not need to have a correct counter value. These messages may also be authenticated in another way, e.g., by including a sequence number. Sequence numbers also prevent replay, but are not suited for a larger open network, as it would require for each device to maintain a sequence number with each other device. Alternatively, maintenance purposes preferably use peer to peer communication; for example, a handshake security protocol may be used, which does not require group authentication.

Also in other modes, the preferred mode of communication uses authenticated messages, authenticated with the group key and having a correct counter value, i.e., within the delay threshold of counter 130 of the network node. However, in these other modes, some exceptions may be made.

In an embodiment, network node 110 has an initialization mode; mode 142 may contain a representation of initialization mode. Network node 110 enters initialization mode after start-up of network node 110, or e.g., after reset of node 110, etc.

In initialization mode, communication unit 120 is arranged to accept a received counter synchronization message after verifying an authentication of the received message with the cryptographic key. The communication unit would require in normal mode that the received counter synchronization message also has a correct counter value, but in initialization mode this is not required.

In initialization mode, counter manager 140 is arranged to start the synchronization timeout period. Thus the synchronization timeout period is also started when node 110 enters initialization mode. As noted above, the synchronization timeout period is also started when node 110 receives a counter synchronization message in normal or initialization mode.

Also in initialization mode, if the synchronization timeout period expires without receiving a counter synchronization message during the synchronization timeout period, the mode is switched to coordinator mode.

Upon receiving a counter synchronization message in initialization mode within the synchronization timeout period, counter manager 130 adjusts the counter to a counter value in the counter synchronization message, starts a synchronization timeout period, and switches to normal mode. In this embodiment, a network node in initialization mode will join the counter value of the existing network which uses his group key, without requiring a correct counter value.

In an embodiment, the network node 110 in initialization mode will not accept other authenticated messages, except messages that control the counter values in the network, in particular counter synchronization messages, (and optionally resigned messages, see below). Thus there is no opportunity to replay a command during this period. Messages sent by network node 110 would not be accepted by the other nodes in the network as the counter value of an uninitialized network is highly likely incorrect.

This implies that a network node would have to wait until a counter synchronization message is received before it can do useful communication. This problem may be addressed by sending a counter synchronization request message.

In an embodiment, in initialization mode counter manager 140 is arranged to send a counter synchronization request message to the network nodes in the group. In coordinator mode, the counter manager is arranged to send a counter synchronization message to the network nodes in the group upon receiving a counter synchronization request message, said counter synchronization message comprising a current value of the counter. The request delay timeout period is less than the synchronization timeout period.

This shortens the time a network node has to wait until it receives an update of the counter value and can start to participate in useful communication, e.g., sending and receiving authenticated messages. Counter synchronization request messages are optional.

FIG. 2 shows as an example, an embodiment of a counter synchronization request message 203. Counter synchronization request message 203 comprises a counter synchronization request indication 223 and an authentication token computed over the message. This message does not require a counter value. A normal node will not accept the counter synchronization request message 203 due to the lacking counter value, but a node in coordinator mode will accept it.

In an embodiment, counter manager 140 is arranged to include a nonce in the counter synchronization request message (not shown in FIG. 2). For example, the nonce may be a random number. The counter synchronization message may include an encryption of the nonce. This avoids replay of a counter synchronization message. The authentication token 240 is computed over both counter synchronization request indication 223 and the nonce.

The nonce may be the counter value of the network node in initialization mode, especially if the counter is randomized when the network node enters initialization mode. Note that even in this case, a normal node will not accept the message due to an incorrect counter value. In any case, a node in normal mode may be arranged to ignore counter synchronization request messages.

Without the nonce in the counter synchronization request message, replay of in the counter synchronization messages may (only) affect devices that are in initialization mode. To exploit this, the attacker must have a way to bring a device to initialization mode and will have to keep repeating correct incrementing time sync messages otherwise the device will timeout, become a coordinator, be told to resign by the real coordinator and will resign (and so join the existing group). As this contingency is remote, the nonce is optional.

In an embodiment, in initialization mode counter manager 140 is arranged to start a request delay timeout period before sending the counter synchronization request message. The counter synchronization request message is sent at the end of the request delay timeout period. Also this timeout period may comprise a random delay. If during the request delay timeout a counter synchronization request message or a counter synchronization message is received the timeout period is terminated.

Figure 5:
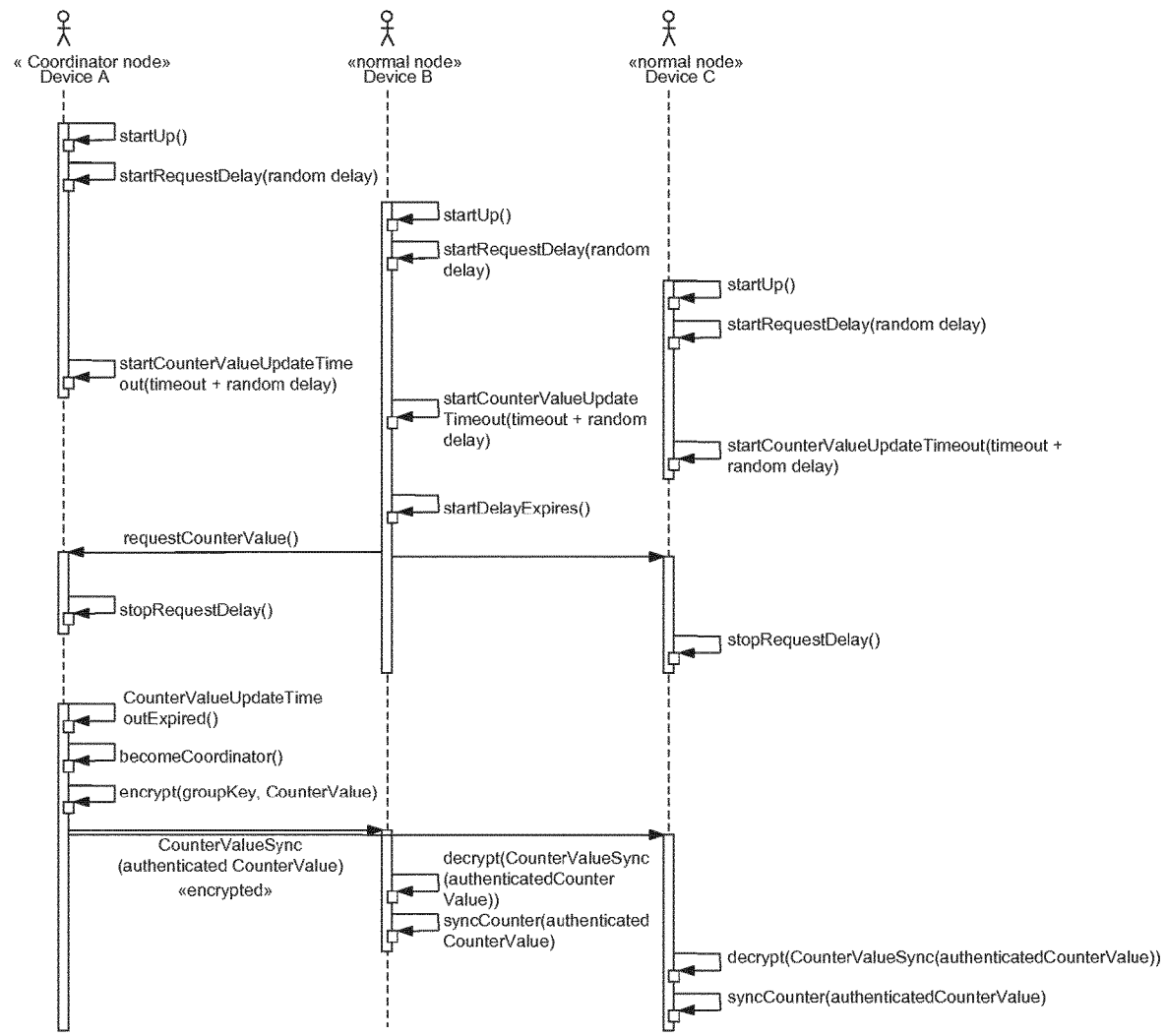

FIG. 5 shows a possible sequence diagram of an embodiment of starting-up a group of network nodes. Shown are three network nodes: devices A, B, and C. There is no existing coordinator node, i.e., network node in coordinator mode. First each device is started, e.g. powered-up, or reset, etc. (startUp). Next each device starts a request delay timeout period (startRequestDelay), e.g., using timer 144, and also the synchronization timeout period (startCounterValueUpdateTimeOut). The synchronization timeout period may be started before the request delay timeout period, but the periods are configured so that the request delay timeout period expires first.

It happens, in FIG. 5, that the starts request delay timeout period expires first for device B (startDelayExpires). As a result Device B sends a counter synchronization request message (requestCounterValue); in this case the message is a broadcast in the group. Devices A and C receive the counter synchronization request message. As devices A and C are in initialization mode they will accept the counter synchronization request message and terminate the delay timeout period. This avoids that many counter value requests are sent on the network, especially on a large network at startup this may generate a lot of network activity. In this case, since none of the devices has switched to coordinator mode yet, no device responds to the counter synchronization request message. Until this point all devices are in initialization mode.

At some point the synchronization timeout period of a device expires (CounterValueUpdateTimeoutExpired), in the example of FIG. 5, this is device A. As a result, device A switches to coordinator mode and starts to send out counter synchronization messages (CounterValueSync). Although devices B and C cannot verify the counter value, they will accept the counter synchronization message and adjust their counters (syncCounter). Devices B and C switch to normal mode. The result is a network in which all counters are synchronized, and there is a coordinator who ensures that the counters stay synchronized.

Figure 6:
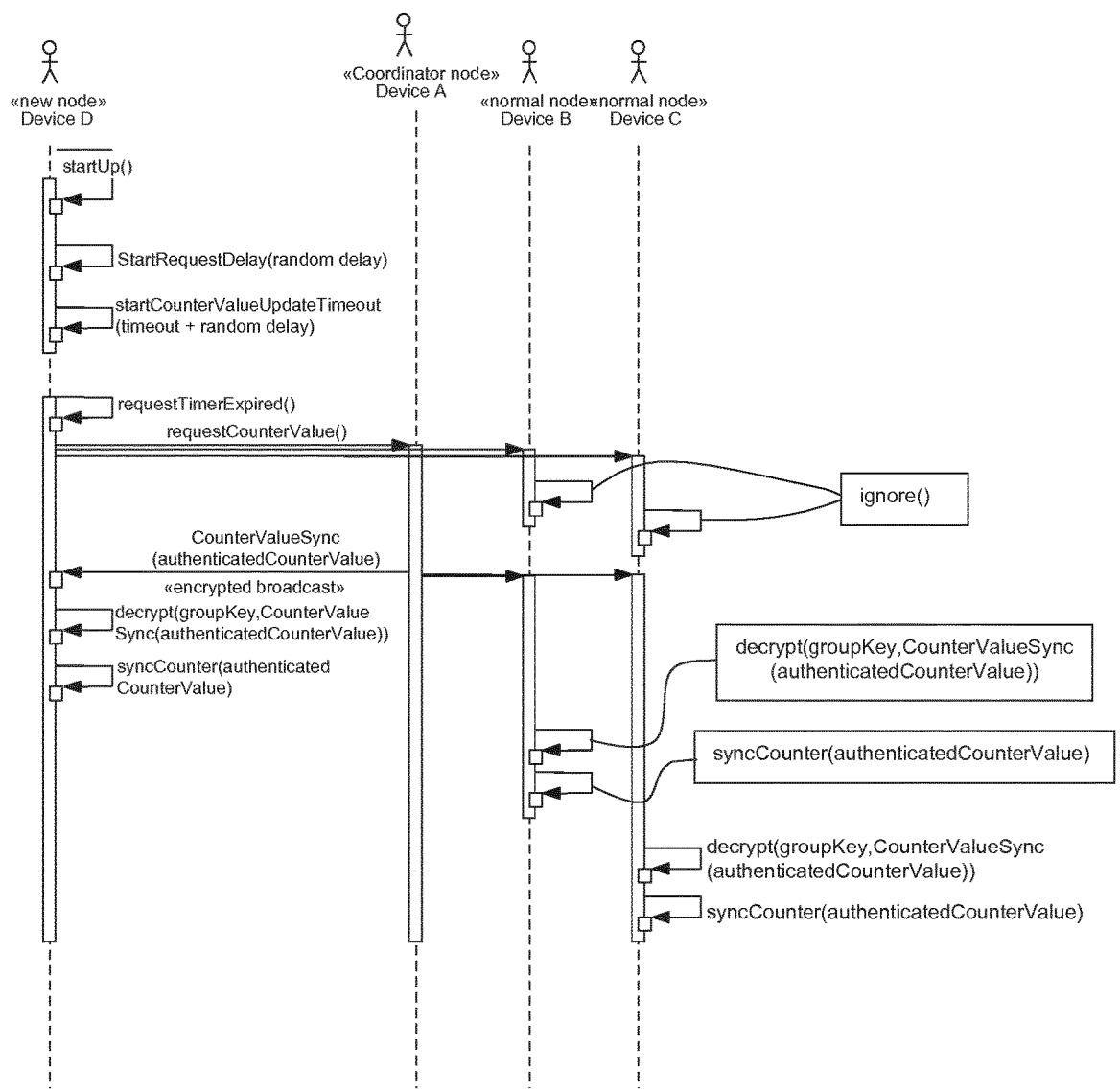

FIG. 6 shows a possible sequence diagram of an embodiment of adding a new network node to an existing group of network nodes, say the group initialized in FIG. 5. Shown are devices A, B, and C, with A in coordinator mode and devices B and C in normal mode. A new device D is added to the network. Device D shares the group key, but is just started. Device D is in initialization mode. As device D just started it does not have a synchronized counter.

Device D starts the request delay timeout period and the synchronization timeout period. The request delay timeout period expires first, and we assume that device D did not receive a counter synchronization message in that time. As a result D will send a counter synchronization request message (requestCounterValue). This message is broadcasted in the group. Devices B and C, who are in normal mode ignore this message, but device A who is in coordinator mode sends a counter synchronization message in response. All devices D, B, and C receive the counter synchronization message and synchronize their counters. Devices B and C will verify the authentication and that a correct counter value is included in the counter synchronization message, device D will only verify the authentication.

Due to bad quality of the network or changes in the physical network, etc., it is possible that the network formed by the group of network nodes splits into two or more groups, called islands. The network nodes in an island fail to receive network messages from the other island. As a result each island will appoint a coordinator. Later, it may happen that the two groups see each other again. For example, in an ad-hoc network a node may be added which bridges the two islands. It is desirable that islands merge again.

The network nodes in normal mode in the same island as a network node in coordinator mode are called the members of the coordinator node.

In an embodiment, in coordination mode, the counter manager is arranged to upon receiving a counter synchronization message, send a resign message, the resign message comprising a counter value stored in the counter. A coordinator node should normally not receive counter synchronization messages, only send them. So when a counter synchronization message is received in coordinator mode (an 'offending' counter synchronization message), something is wrong. A resign message is sent to instruct the other coordinator node to switch back to normal mode. The resign message must be coded with the counter of the received counter synchronization message.

When a counter manager receives a resign message in coordinator mode, from another network node, the counter manager compares its own counter value with the counter value received in the resign message. Conflicts could be resolved by preferring higher counter values. As counters increase, this helps to avoid replays. We say that a coordinator node with a higher counter has the 'better' counter. The resign message must be correctly coded according to the receiving nodes counter.

If the received counter value is larger than the counter value stored in the counter, (thus the other coordinator node that sent the resign message has the better counter) then the counter manager sends a resigned message. The resigned message comprises the counter value stored in the counter and the received counter value. The counter manager adjusts counter 130 to the received counter value and switches to normal mode. The order of the operations may be changed if desired.

In normal mode, the counter manager is arranged to, upon receiving a resigned message, adjusting the counter to the counter value received from the other network node in the resigned message. The resigned message must be correctly authenticated according to the stored counter of the receiving node.

FIG. 2 shows as an example, an embodiment of a resign message 204 and a resigned message 205.

Resign message 204 includes the counter value 213 received from the other coordinator node in the offending counter synchronization message, so that the resign message will pass the test of the other network and be accepted. When the other coordinator node receives the resign message, it will verify that the counter value in the resign message is within the delay threshold of its own counter and verify the authentication. Resign message 204 further includes a counter value of counter 130, so that the other coordinator can make a comparison of the counter values, and may include a resign indication 224 to recognize the message as a resign message, and an authentication token computed at least over elements 213, 212 and 224. The resign message will be ignored by nodes in different islands that have different counter values and by nodes that are in normal or initialization mode.

Resigned message 205 includes a counter value 212 of the own counter 130, so that the message will be accepted by the nodes in the same island as network node 110. Furthermore, resigned message 205 includes the counter value 213 received from the other coordinator node in the offending counter synchronization message. (Note that the counter value 213 is a different value from counter value 213 of message 204.) Counter value 213 is included in the resigned message 205 so that normal nodes will adjust their counter to counter value 213. Resigned message 205 may also include resigned indication 225 so that the message can be recognized as a resigned message. For a counter synchronization message a normal node will adjust its counter to the same counter value it used for authenticating the counter synchronization message, but for a resigned message a normal node will use a different counter value for authenticating than for adjusting. Through the resigned message, the coordinator instructs the normal nodes in its island to change their counter to the counter value of the other island. Without this resigned message, only the time coordinator would join the other island and all its members would select a new coordinator that would in turn be told to resign. So in the end the island would move member by member. The resigned method moves the whole member group in one go to the other island. In embodiments which use the resigned message this is optimized.

The counter value needed for authentication may be indicated in a message recognizable to the receiving node, e.g., by adding a prefix, such as 'CounterValueForAuthentication' or the like, or by placing the counter value in a special place, e.g., at the start of the message, or placed in a payload say an encrypted portion. A counter value which is not for authentication, but for comparison or synchronizing may be similarly recognizable.

It may happen that some node has a bad connection with the other nodes. Such a node may from time to time, as network conditions change, become visible to the other nodes or invisible. This is especially a problem in wireless networks. If the bad network node loses connection it will become an island of one network node, in which it will become coordinator. When the connection is reestablished, the bad network node will start arbitration with the coordinator of the other island, e.g., the rest of the network nodes. If the bad network node has the better counter, it will win the arbitration and become coordinator of the entire network, forcing all network nodes to change their counter. However, sometime later the connection may be lost again after which the entire scenario may start again, the bad node becoming coordinator in its own island, and so on. It is desirable that a single bad network does not cause frequent changes of the coordinator and counters.

This may be avoided, by having a coordinator that has the better counter checking if it has any members. If it does not, it is an island consisting of only a coordinator; in this case, a coordinator still yields to the other coordinator, even if it has the better counter.

In an embodiment, in coordination mode the counter manager is arranged to:

if the received counter value is less than the counter value stored in the counter (thus the counter manager has the better counter, and would normally not follow-up with a resigned message), to send a member request message. If no membership message is received in response within a member request period then, send a resigned message, the resigned message comprising the counter value stored in the counter and the received counter value, adjust the counter to the received counter value, and switch to normal mode.

In normal mode, the counter manager is arranged to, upon receiving a member request message to respond with a membership message.

FIG. 2 shows as an example an embodiment of a member request message 206. Member request message 206 comprises a counter value 212, a member request indication 226, and an authentication token computed at least over value 212 and indication 226.

FIG. 2 shows as an example an embodiment of a membership message 207. Membership message 207 comprises a counter value 212, a membership indication 227, and an authentication token computed at least over value 212 and indication 227.

Figure 7:
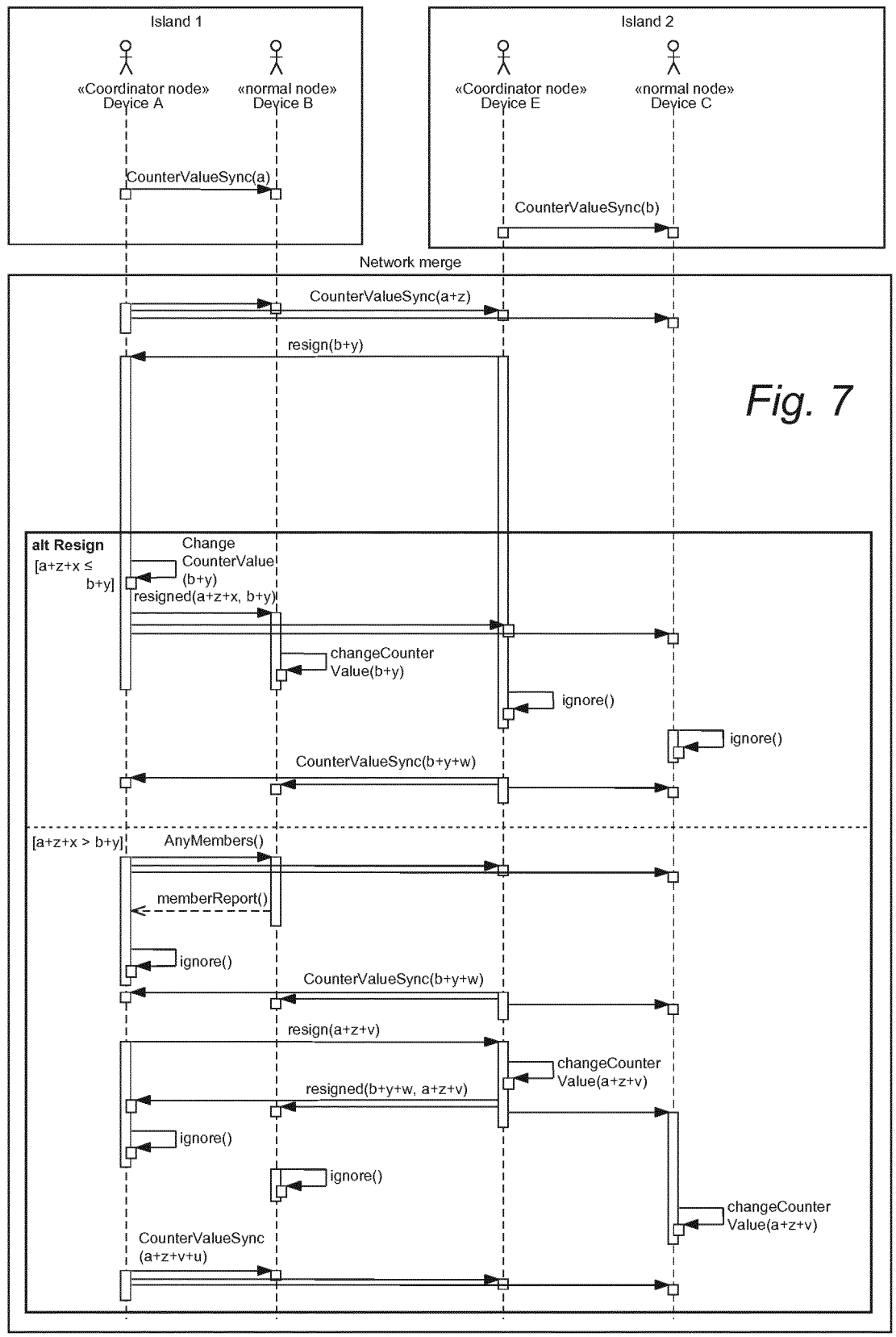

FIG. 7 shows a possible sequence diagram of an embodiment of merging two groups of network nodes. Shown are four network nodes divided in two islands. In island 1, is coordinator node A and network node B. In island 2 is coordinator node E and normal node C.

Coordinator A sends a counter synchronization message (CounterValueSync(a)), and coordinator E sends a counter synchronization message (CounterValueSync(b)). Next some event caused network traffic between islands 1 and 2 to reach other, so that the two islands can now send and receive messages between them. These messages will likely not be accepted though since the two islands may be on different counters. Coordinator A is started with counter value a. Coordinator E is started with counter value b, (counter value 'a' differs from value 'b'). As time progresses, counter values are indicates as 'a' or 'b' plus some letter (x, y, z, v, w, etc.) to indicate that the counters have progressed in the meantime.

When coordinator E receives the counter synchronization message (CounterValueSync(a+z)), it will respond with a resign message. Note that the counter synchronization message from device A cannot be authenticated by coordinator E, as the counter value is incorrect. This is not a problem, since coordinator E will not resign based on a received counter synchronization message. However, coordinator E will respond with a resign message (resign (b+y). The resign message will be accepted, since coordinator E did not use his own counter value to authenticate but the received counter value of coordinator A.

After coordinator A receives the resign message, two things may happen depending on who has the better counter.

If the counter of coordinator A is less than the counter value received from coordinator E (a+z+x<=b+y), then coordinator A will send out a resigned message with its own counter value for authentication. The member of coordinator A will accept this message, the nodes in island 2 will ignore it, since the counter value is incorrect. The normal node B will adjust its counter value to a counter value in the resigned message (changeCounterValue(b+y)). Coordinator A switches to normal mode. At some point coordinator E sends counter synchronization messages which are now accepted by all network nodes, i.e., the two islands have joined, and there is only one coordinator.

If the counter of coordinator A is higher than the counter value received from coordinator E (a+z+x>b+y), coordinator A has the better count. Coordinator A will verify if he is the single node in its island. Coordinator A proceeds by sending a member request message. Since network nodes in island 2 cannot authenticate the message they will ignore it. But network node B will respond by sending a membership message (memberReport). When Coordinator A receives the membership message, it establishes that he has members. Since coordinator A also has the better counter, he can ignore the resign message of coordinator E.

At some point later, coordinator E will send a counter synchronization message. This message will prompt coordinator A to send a resign message of its own. Now coordinator E does not have the better counter and he proceeds to resign as described above.

Figure 8:
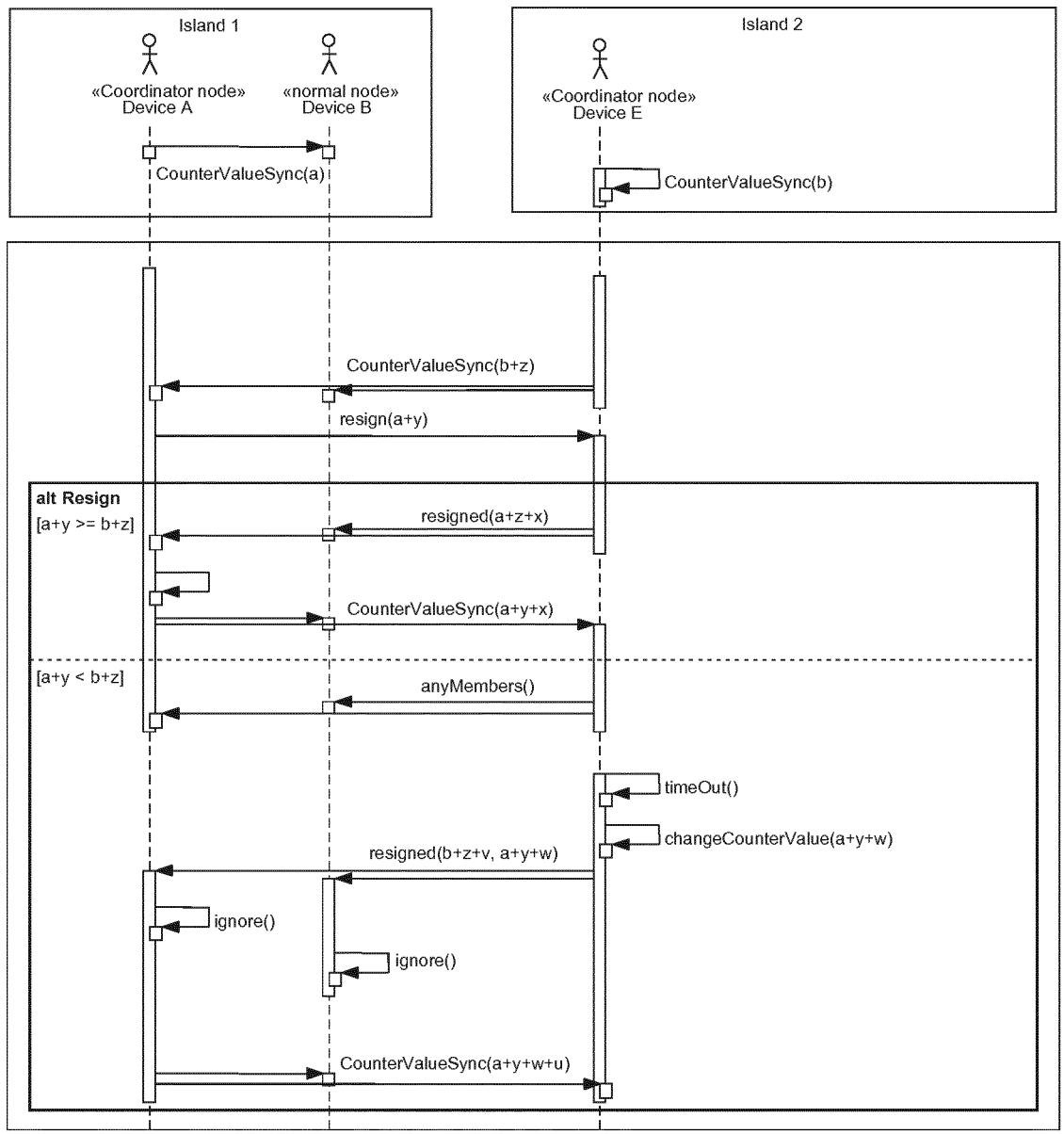

FIG. 8 shows a possible sequence diagram of an embodiment of merging two groups of network nodes. In this case island 2 has only one member: coordinator E. At the top of the sequence coordinator E receives a resign message. The sequence then proceeds the same as for FIG. 7, but in this case no membership messages are received, thus coordinator E will resign even if he has the better counter.

Instead of requiring a single membership message to start resigning, an embodiment may also require some other minimum number of membership messages. If fewer than the minimum number of membership messages are received a coordinator will resign in response to a resign message even if it has the better counter. For example, the minimum number of membership messages may be 2 instead of 1, or even more, etc. Note that in FIG. 8, the counter value indicated by a+y+w indicates that some time has passed since a+y+x.

In embodiment, the request delay timeout period and synchronization timeout period may be implemented using a timer, a clock, an interrupt, etc. The authenticated message, counter synchronization message, counter synchronization request message, resign message, resigned message, member request message, and membership message may all broadcasted or multi-casted.

Figure 9:
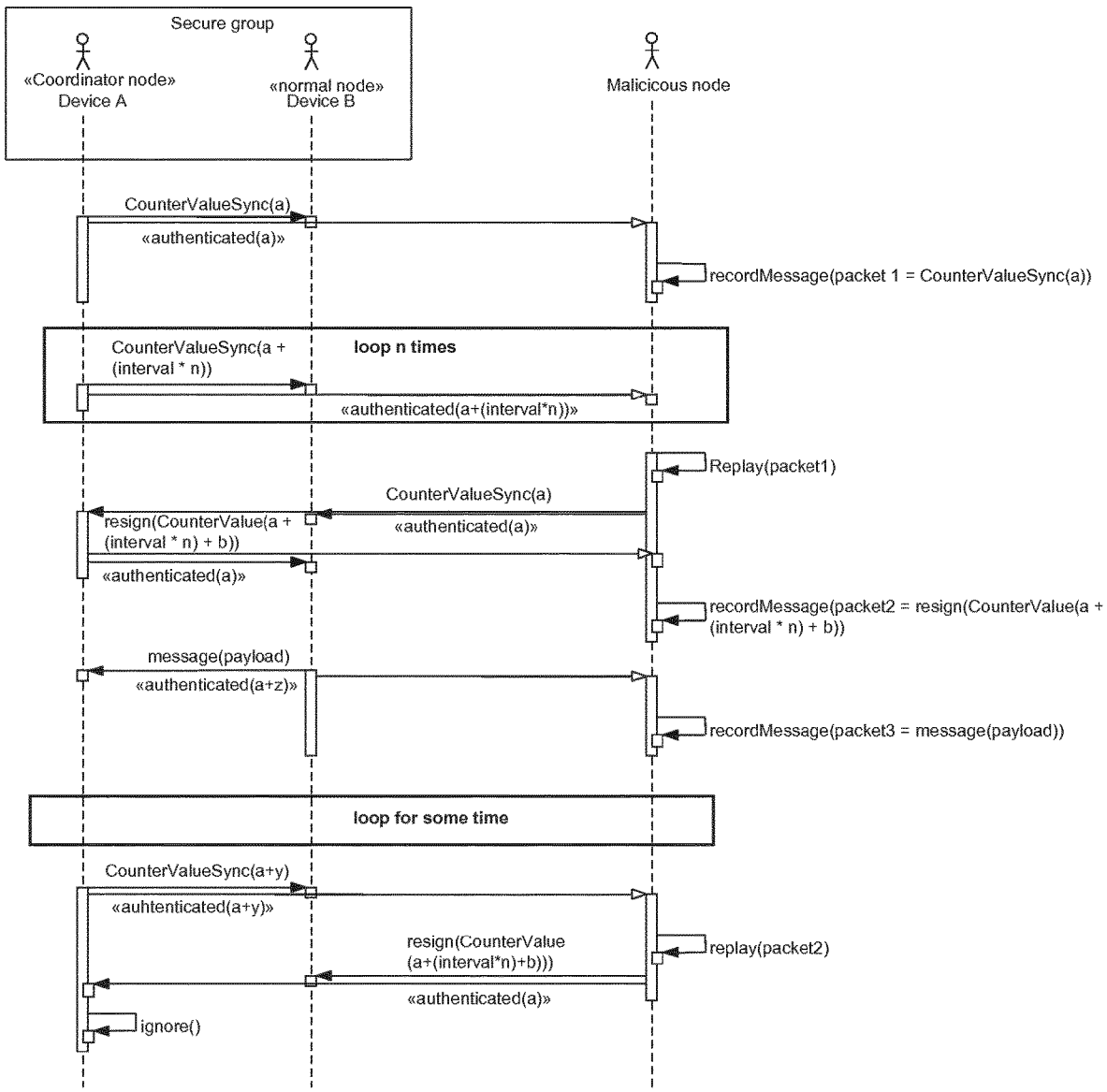

FIG. 9 schematically shows a sequence diagram illustrating an example of replaying a message. Shown in FIG. 9 are two network nodes A and B; network node A being in coordinator mode, network node B being in normal mode. A malicious node, e.g., an attacker, records messages exchanged between devices A and B and tries to achieve some advantage through replaying them.

At the top, coordinator A sends a counter synchronization message, which is recorded by the malicious node. After some time, (sending 'n' further counter synchronization messages), the malicious node replays the recorded counter synchronization message. Network node B will ignore the replayed message as it is not fresh: the received counter value is not close enough to the counter of device B. Coordinator A will respond with sending a resign message.

The malicious node records the resign message and also a normal authenticated message. At some later point he may replay these messages. The resign message is ignored since the counter of device A has advanced, i.e., device A has the better count. Also network node B will ignore the messages as the authentication fails.

There is a brief interval in which a malicious node may have an opportunity for a replay. By replaying a message immediately after it was received, the malicious node may avoid failing authentication if the difference in the counter values is less than the delay threshold. The use of such a replay may be further reduced in a control network by using only so-called a stateless command in a message. A stateless command does not require the receiving node to keep a state to interpret the command. For example, a command to change a value may comprise the new value of a parameter, rather than an increment or decrement. The latter would require the receiving node to use the current value of parameter to compute the new value of the parameter. However in the stateless version, which includes the absolute value of a parameter rather than a relative value, the current value of the parameter is not required to compute the new value. If an increment value is replayed quickly enough, it would result in a double increment of the parameter. In an embodiment, an authenticated message comprises an absolute value of a parameter the receiving node, changing the parameter to the absolute value. For example, consider a lighting network in which a command is sent to a dimmer. The stateless command includes a particular value to which a dimming parameter should be set by the dimmer; a state full version may request the dimmer to increase or decrease dimming by some amount.

Typically, the device 110 and the other nodes 112 and 114 each comprise a microprocessor (not shown) which executes appropriate software stored at the devices; for example, that software may have been downloaded and/or stored in a corresponding memory, e.g., a volatile memory such as RAM or a non-volatile memory such as Flash (not shown).

Alternatively, the device 110 may, in whole or in part, be implemented in programmable logic, e.g., as field-programmable gate array (FPGA). Device 110 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, network node 110 comprises a communication circuit, a counter circuit, an incrementing circuit, a counter manager circuit and a key storage circuit. The circuits implement the corresponding units described herein. The circuits may be a processor circuit and storage circuit, the processor circuit executing instructions represented electronically in the storage circuits. The circuits may also be, FPGA, ASIC or the like.

In embodiment of the network method, the network method has a normal mode and a coordinator mode. The method comprises:

sending and receiving electronic messages within a group of network nodes, incrementing a counter at regular time intervals, in normal mode:

upon receiving a counter synchronization message, adjusting the counter to a received counter value in the received counter synchronization message, and start a synchronization timeout period, upon expiry of the synchronization timeout period without receiving a counter synchronization message during the synchronization timeout period, switching the method to coordinator mode, and in coordinator mode:

periodically send a counter synchronization message to the network nodes in the group, said counter synchronization message comprising a current value of the counter.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform the network method. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 10A:
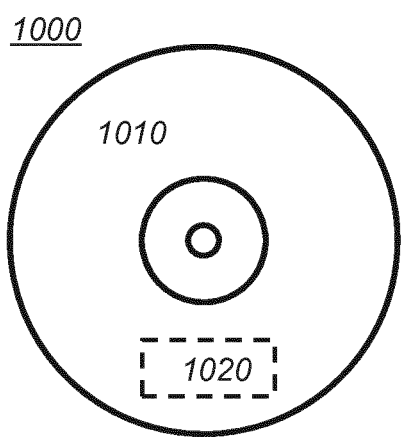

FIG. 10*a* shows a computer readable medium 1000 having a writable part 1010 comprising a computer program 1020, the computer program 1020 comprising instructions for causing a processor system to perform a method according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said network method.

Figure 10B:
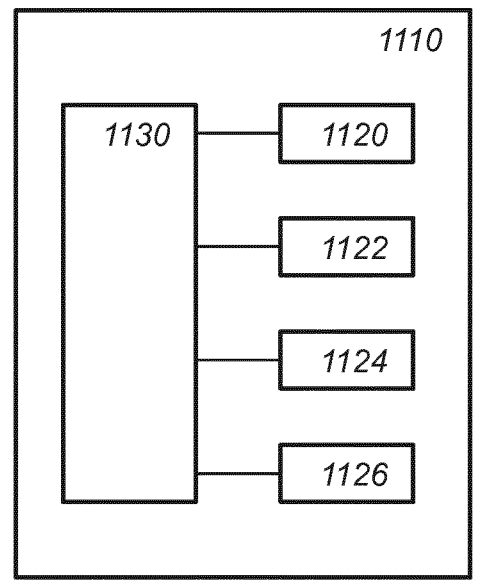

FIG. 10*b* shows in a schematic representation of a processor system 1140 according to an embodiment. The processor system comprises one or more integrated circuits 1110. The architecture of the one or more integrated circuits 1110 is schematically shown in FIG. 10*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. A network node having a normal mode and a coordinator mode, comprising:
   a communication unit arranged to send and receive electronic messages within a group of network nodes,
   a counter and an incrementing unit, the incrementing unit being arranged to increment the counter at regular time intervals,
   a counter manager, wherein the counter manager is arranged to
   in normal mode:
      upon receiving a counter synchronization message, adjust the counter to a received counter value in the received counter synchronization message, and start a synchronization timeout period,
      upon expiry of the synchronization timeout period without receiving a counter synchronization message during the synchronization timeout period, switch the network node to coordinator mode,
   in coordinator mode:
      periodically send a counter synchronization message, comprising a current value of the counter, to the network nodes in the group.

2. A network node as claimed in claim 1, comprising:
   a key storage arranged for storing a cryptographic key, wherein in normal mode,
   the communication unit is arranged to reject a received message after failing to verify an authentication of the received message with the cryptographic key, and to reject after failing to verify that a received counter value obtained from the received message differs less than a delay threshold from a counter value stored in the counter of the network node, and
   the communication unit is arranged to include a counter value stored in the counter of the network node in a message and to authenticate said message with the cryptographic key before sending said message.

3. A network node as claimed in claim 1 having an initialization mode, the network node being in initialization mode after start-up of the network node, wherein in initialization mode
   the communication unit is arranged to accept a received counter synchronization message after verifying an authentication of a received message with a cryptographic key,
   the counter manager is arranged to
   start the synchronization timeout period, and
   upon expiry of the synchronization timeout period without receiving a counter synchronization message during the synchronization timeout period, switch to coordinator mode,
   upon receiving a counter synchronization message within the synchronization timeout period, adjusting the counter to a counter value in the counter synchronization message received within the synchronization timeout period, starting a synchronization timeout period, and switch to normal mode.

4. A network node as claimed in claim 1 having an initialization mode, wherein
   in initialization mode,
      the counter manager is arranged to send a counter synchronization request message to the network nodes in the group, and
   in coordinator mode,
      the counter manager is arranged to send a counter synchronization message, comprising a current value of the counter, to the network nodes in the group upon receiving a counter synchronization request message.

5. A network node as claimed in claim 4, wherein
   in initialization mode the counter manager is arranged to start a request delay timeout period,
      upon expiry of the request delay timeout period without receiving a counter synchronization request message and without receiving a counter synchronization message, sending the counter synchronization request message to the network nodes in the group,
      upon receiving any one of a counter synchronization message and a counter synchronization request message, terminating the request delay timeout period.

6. A network node as claimed in claim 1, wherein the counter is randomized after start-up of the network node.

7. A network node as claimed in claimed 1, wherein
   in coordinator mode, the counter manager is arranged to
      upon receiving a counter synchronization message, send a resign message comprising a counter value stored in the counter,
      upon receiving a resign message from another network node, comparing the counter value stored in the counter with a received counter value obtained from the received resign message from the other network node,
      if the received counter value received from the other network node is larger than the counter value stored in the counter, send a resigned message comprising the counter value stored in the counter and the received counter value from the other network node, adjust the counter to the received counter value from the other network node and switch to normal mode,
   in normal mode, the counter manager is arranged to, upon receiving the resigned message from the other network node, adjusting the counter to the counter value received from the other network node in the resigned message.

8. A network node as claimed in claim 7, wherein
   in coordinator mode, the counter manager is arranged to
      if the received counter value from the other network node is less than the counter value stored in the counter, send a member request message, if no membership message is received in response within a member request period then, send a resigned message comprising the counter value stored in the counter and the received counter value from the other network node, adjust the counter to the received counter value from the other network node and switch to normal mode,
   in normal mode, the counter manager is arranged to, upon receiving a member request message to respond with a membership message.

9. A network node as claimed in claim 1 arranged to receive a stateless command in a message.

10. A network method having a normal mode and a coordinator mode, the method comprising:
   sending and receiving electronic messages within a group of network nodes,
   incrementing a counter at regular time intervals,
   by a network node in normal mode:
      upon receiving a counter synchronization message, adjusting the counter to a received counter value in the received counter synchronization message, and start a synchronization timeout period,
      upon expiry of the synchronization timeout period without receiving a counter synchronization message during the synchronization timeout period, switching the method to coordinator mode, and by the network node in coordinator mode:
periodically send a counter synchronization message to the network nodes in the group, said periodically sent counter synchronization message comprising a current value of the counter.

11. A computer readable non-transitory medium having stored therein instructions for causing a processor to execute a method having a normal mode and a coordinator mode, the medium comprising code for:
sending and receiving electronic messages within a group of network nodes,
incrementing a counter at regular time intervals, by a network node in normal mode:
upon receiving a counter synchronization message, adjusting the counter to a received counter value in the received counter synchronization message, and start a synchronization timeout period,
upon expiry of the synchronization timeout period without receiving a counter synchronization message during the synchronization timeout period, switching the method to coordinator mode, and by the network node in coordinator mode:
periodically send a counter synchronization message to the network nodes in the group, said periodically sent counter synchronization message comprising a current value of the counter.

\* \* \* \* \*